Patented July 4, 1939

2,164,786

UNITED STATES PATENT OFFICE 2,164,786

DEVELOPABLE AZO DYES AND PROCESS OF PRODUCING THE SAME ON THE FIBER

Swanie Siguard Rossander, Wilmington, Del., assignor to E. I. du Pont de Nemours & Company, Wilmington, Del., a corporation of Delaware No Drawing. Application November 20, 1937, Serial No. 175,641

11 Claims. (Cl. 8—46)

This invention deals with novel azo dyes which are substantive to cellulosic fiber, and which are designed for development on the fiber to produce fast dyeings.

More particularly, this invention deals with novel polyazo dyes of the general formula

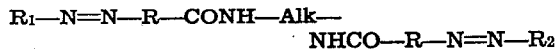

wherein Alk designates the bivalent residue of a saturated hydrocarbon, for instance a paraffin hydrocarbon having from 2 to 18 carbon atoms or a cyclo paraffin hydrocarbon; R stands for a divalent radical of the benzene series, such as benzene or its alkyl, alkoxy or halogen substitution products; the —N=N— groups are meta or para to the CONH groups on the benzene nuclei and $R_1$ and $R_2$ designate azo dye coupling components which contain water-solubilizing groups, such as sulfo or carboxy, and which contain further a primary amino group. The water-solubilizing groups impart to my novel dyestuffs substantivity toward vegetable fiber, while the amino groups enable these dyestuffs to be developed on the fiber by tetrazotization and coupling to water-insolubilizing components, whereby the dyeings become fast to washing.

The preparation of dyestuffs of the above general formula is more fully described in my co-pending application, Ser. No. 175,640, filed simultaneously herewith. My present application is concerned more particularly with the details of development on the fiber, and with the form of the dyestuff on the fiber when so developed.

By cellulosic fiber in this discussion I have in mind the usual textile fibers of vegetable origin and composed principally of cellulose such as cotton or regenerated cellulose.

As typical illustrations of "Alk" in the above general formula may be mentioned the divalent radical of ethane, hexane, decane or cyclohexane. As typical illustrations of R may be mentioned benzene, and its methyl, ethyl, methoxy, ethoxy, chloro or bromo substitution derivatives. As typical coupling components $R_1$ and $R_2$ which may be alike or different, may be mentioned the amino-naphthol-sulfonic acids, the amino-aroylamino-naphthol-sulfonic acids, and the aminoaryl-pyrazolone-carboxylic acids.

As suitable developing components after tetrazotization on the fiber may be mentioned the naphthols, the aryl-methyl-pyrazolones, the aceto-acetarylids, the meta-phenylene-diamines, or any other developer of those customarily employed in the art and having no water-solubilizing groups.

After development on the fiber, the novel compounds of my invention possess the general structure indicated by the following formula

wherein X stands for a di-(amino-aroylamino) derivative of a saturated hydrocarbon which can be tetrazotized and coupled to coupling components; $Y_1$ and $Y_2$, which may be the same or different, represent coupling components each of which contains a free amino group which, after coupling, is capable of further diazotization and coupling. Either or both of $Y_1$ and $Y_2$ may contain a solubilizing group such as carboxylic acid or sulfonic acid; D may be a developing agent of the benzene, naphthalene, pyrazolone or aceto-acetarylide series, which does not contain a solubilizing group such as carboxylic or sulfonic acid.

Without limiting my invention to any particular procedure, the following examples are given to illustrate my preferred mode of operation. Parts mentioned are by weight.

Example I

Five parts of cotton piece goods is dyed by immersion into a solution of ten-hundredths parts of the disazo dye obtained by coupling tetrazotized di-(p-aminobenzoyl)-ethylene-diamine into two molecules of p-aminobenzoyl-J acid, in approximately 500 cc. water. The solution is maintained at 180 to 212° F. for ½ hour; salt being slowly added to exhaust the dyestuff. The dyed fabric is rinsed in cold water and put in 200 parts of water at 20° C. Add three-tenths parts of sodium nitrite and four-tenths parts of sulfuric acid. Stir 15 minutes. Rinse with cold water. Dissolve one-tenth part of beta-naphthol in 200 parts water and one-twentieth part of caustic soda. Stir the solution rapidly while adding the above rinsed piece goods. Stir 15 minutes. Rinse in cold water and dry. The dyeing is a bright orange shade of outstanding fastness to washing. The probable formula of the dye on the fiber is ing component which is free of water and solubilizing groups.

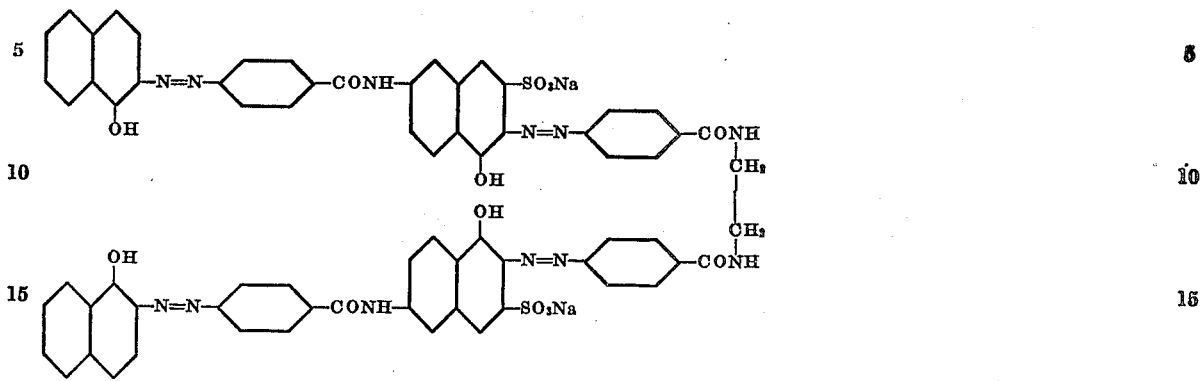

In a similar manner other dyes of the series disclosed in my copending application of even date, Ser. No. 175,640, may be developed on the fiber into the corresponding tetrakosazo or polyazo dyestuffs or outstanding fastness to washing.

In the following table are given a number of dyestuffs actually prepared by me together with their shade on the fiber. In this table, the symbol PAB stands for "para-aminobenzoyl"; MAB, for "meta-aminobenzoyl".

2. An azo dye of the general formula

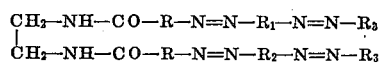

wherein R stands for a divalent aryl radical of the benzene series, the two valences of R being in a position selected from the group consisting of meta and para, $R_1$ and $R_2$ stand for azo-dye coupling components which contain water-solubilizing groups, and $R_3$ stands for an azo-dye

| Dyestuff in substance | | Developed with— | Shade on cotton or regenerated cellulose |
|---|---|---|---|
| Tetrazo component of— | Coupled to two moles of— | | |
| Di-(PAB)-ethylene-diamine | PAB-J-acid | Beta-naphthol | Orange. |
| Do | do | 1-phenyl-3-methyl-5-pyrazolone | Yellow orange. |
| Do | do | Acetoacetanilide | Do. |
| Do | do | Meta-tolylene-diamine | Red orange. |
| Di-(PAB)-decamethylene-diamine | J-acid | Beta-naphthol | Bordeaux. |
| Do | 1-meta-aminophenyl-5-pyrazolone-3-carboxylic-acid | do | Orange. |
| Di-(PAB)-decamethylene-diamine | PAB-J-acid | do | Do. |
| Do | MAB-J-acid | do | Do. |
| Do | MAB-H-acid | do | Red. |
| Di-(MAB)-decamethylene-diamine | PAB-J-acid | do | Orange. |
| Do | 1-meta-amino-phenyl-5-pyrazolone-3-carboxylic-acid | do | Do. |
| Di-(PAB)-ethylene-diamine | J-acid | do | Bordeaux. |
| Do | MAB-J-acid | do | Orange. |
| Do | 1-meta-amino-phenyl-5-pyrazolone-3-carboxylic acid | 1-phenyl-3-methyl-5-pyrazolone | Yellow. |
| Do | do | Beta-naphthol | Orange. |
| Di-(PAB)-ethylene-diamine | Di-(PAB)-3,5-diamino-benzoyl-J-acid | do | Do. |
| Di-(MAB)-ethylene-diamine | J-acid | do | Bordeaux. |
| Do | MAB-J-acid | do | Orange. |
| Do | PAB-J-acid | do | Do. |
| Do | 1-meta-amino-phenyl-5-pyrazolone-3-carboxylic-acid | do | Do. |
| Do | do | 1-phenyl-3-methyl-5-pyrazolone | Yellow. |
| Di-(PAB)-cyclohexyldiamine | J-acid | Beta-naphthol | Bordeaux. |
| Do | PAB-J-acid | do | Orange. |
| Do | 1-meta-amino-phenyl-5-pyrazolone-3-carboxylic-acid | do | Do. |
| Do | do | 1-phenyl-3-methyl-5-pyrazolone | Yellow. |

It will be understood that the details of procedure may be varied within the skill of those engaged in this art, without departing from the spirit of this invention.

I claim:

1. An azo dye of the general formula

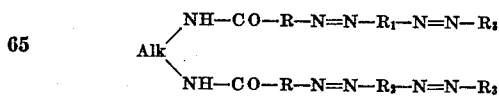

wherein Alk stands for the bivalent radical of a saturated hydrocarbon having from 2–18 carbon atoms, R stands for a divalent aryl radical of the benzene series, the two valences of R being in a position selected from the group consisting of meta and para, $R_1$ and $R_2$ stand for azo-dye coupling components which contain water-solubilizing groups, and $R_3$ stands for an azo-dye developing component which is free of water solubilizing groups.

3. An azo dye of the general formula

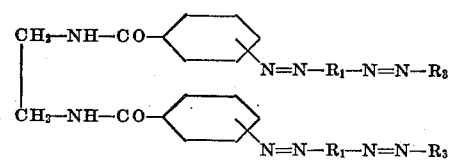

wherein the —N=N— groups being attached to the benzene nuclei in meta or para positions relative to the NHCO groups $R_1$ stand for an azo-dye coupling component which possesses a water-solubilizing group, while $R_3$ stands for an azo-dye developing component which is free of water-solubilizing groups.

4. The azo dye corresponding to the formula

Di(para-aminobenzoyl)-ethylene-diamine
$\overset{\rightarrow}{\rightarrow}$ Para-aminobenzoyl-J-acid $\overset{\rightarrow}{\rightarrow}$ beta-naphthol wherein the arrows $\overset{\rightarrow}{\rightarrow}$ stand for the expression "tetrazotized and coupled to two moles of".

5. The azo dye corresponding to the formula

Di(para-aminobenzoyl)-ethylene-diamine
$\overset{\rightarrow}{\rightarrow}$ 1-meta-aminophenyl-5-pyrazolone
-3-carboxylic acid $\overset{\rightarrow}{\rightarrow}$ 1-phenyl-3-methyl
-5-pyrazolone wherein the arrows $\overset{\rightarrow}{\rightarrow}$ stand for the expression "tetrazotized and coupled to two moles of".

6. The azo dye corresponding to the formula

Di(para-aminobenzoyl)-ethylene-diamine
$\overset{\rightarrow}{\rightarrow}$ J-acid $\overset{\rightarrow}{\rightarrow}$ beta-naphthol wherein the arrows $\overset{\rightarrow}{\rightarrow}$ stand for the expression "tetrazotized and coupled to two moles of".

7. The process of dyeing cellulosic material which comprises applying thereto an azo dye of the general formula $$R_1-N=N-R-CONH-Alk-NHCO-R-N=N-R_2$$

wherein Alk stands for the bivalent radical of a saturated hydrocarbon having from 2–18 carbon atoms, the two valences of R being in a position selected from the group consisting of meta and para, R stands for a divalent aryl radical of the benzene series, and $R_1$ and $R_2$ designate azo-dye coupling components each of which contains a primary amino group and a water-solubilizing group; tetrazotizing the said compound on the fiber, and further coupling the same with an azo-dye developing component which is free of water solubilizing groups.

8. The process of dyeing cellulosic material which comprises applying thereto an azo dye of the general formula

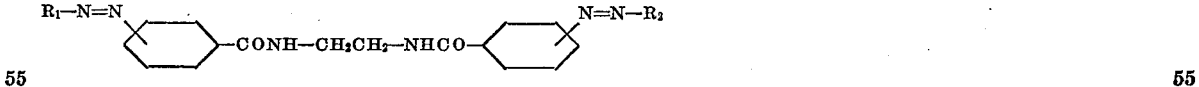

wherein the —N=N— groups being attached to the benzene nuclei in meta or para positions relative to the NHCO groups $R_1$ and $R_2$ designate azo-dye coupling components each of which contains a primary amino group and a water-solubilizing group; tetrazotizing the said compound on the fiber, and further coupling the same with an azo-dye developing component which is free of water-solubilizing groups.

9. The process of dyeing cellulosic material which comprises applying thereto an azo dye of the general formula

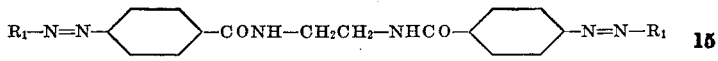

wherein $R_1$ designates an azo-dye coupling component containing a primary amino group and a water-solubilizing group; tetrazotizing the said compound on the fiber, and coupling the same with beta-naphthol.

10. The process of dyeing cellulosic material which comprises applying thereto an azo dye of the general formula

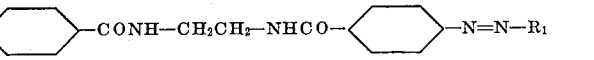

wherein $R_1$ designates an azo-dye coupling component containing a primary amino group and a water-solubilizing group; tetrazotizing the said compound on the fiber, and coupling the same with 1-phenyl-3-methyl-5-pyrazolone.

11. The process of producing a polyazo dye which comprises tetrazotizing a compound of the general formula

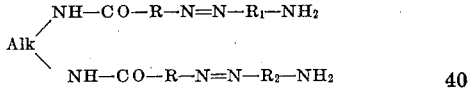

wherein Alk stands for the bivalent radical of a saturated hydrocarbon having from 2–18 carbon atoms, R stands for a divalent aryl radical of the benzene series, the two valences of R being in a position selected from the group consisting of meta and para, and $R_1$ and $R_2$ stand for azo-dye coupling components which contain water-solubilizing groups, and coupling the same to an azo-dye coupling component which is free of water-solubilizing groups.

SWANTE SIGUARD ROSSANDER.